United States Patent [19]

Olschewski et al.

[11] Patent Number: 4,860,605
[45] Date of Patent: Aug. 29, 1989

[54] APPARATUS AND SYSTEM FOR CONVERTING PIVOTING MOTION TO AN AXIAL DISPLACEMENT

[75] Inventors: Armin Olschewski, Schweinfurt; Armin Schlereth, Wasserlosen-Gressthal; Paul-Gerhard Hoch, Schweinfurt, all of Fed. Rep. of Germany

[73] Assignee: SKF GmbH, Schweinfurt, Fed. Rep. of Germany

[21] Appl. No.: 178,619

[22] Filed: Apr. 7, 1988

[30] Foreign Application Priority Data

Apr. 18, 1987 [DE] Fed. Rep. of Germany ....... 3713245

[51] Int. Cl.$^4$ .................... F16H 21/44; F16H 21/54; F16H 25/18
[52] U.S. Cl. .................... 74/99 R; 74/107; 74/567
[58] Field of Search .................... 74/99 A, 107, 99 R, 74/99 I, 567, 569; 188/72.8, 196 BA; 384/620, 621, 623; 464/37, 38

[56] References Cited

U.S. PATENT DOCUMENTS

| | | | |
|---|---|---|---|
| 1,840,462 | 1/1932 | Moittié | 188/72.8 |
| 3,075,395 | 1/1963 | Leland et al. | 74/99 I |
| 3,964,806 | 6/1976 | Harrison | 384/620 |
| 4,620,617 | 11/1986 | Weber | 188/196 BA |

FOREIGN PATENT DOCUMENTS

| | | | |
|---|---|---|---|
| 0190453 | 12/1985 | European Pat. Off. | |
| 0136751 | 12/1902 | Fed. Rep. of Germany | 384/623 |
| 3103398 | 8/1982 | Fed. Rep. of Germany | |
| 1030312 | 5/1966 | United Kingdom | |

*Primary Examiner*—Leslie A. Braun
*Assistant Examiner*—Janice E. Chartoff
*Attorney, Agent, or Firm*—Eugene E. Renz, Jr.

[57] ABSTRACT

A device for producing an axial displacement of two opposing relatively rotatable thrust members having a plurality of conical rolling elements installed between the thrust members which roll on angled ramps hus change the distance between the thrust members, at least one of the thrust washers having a conical face; and a loose outside flange designed as a closed, flexible ring circumscribing the rollers which absorbs the radial forces proceeding from the loaded conical rollers and exerts a binding effect on the conical rollers.

9 Claims, 4 Drawing Sheets

APPARATUS AND SYSTEM FOR CONVERTING PIVOTING MOTION TO AN AXIAL DISPLACEMENT

FIELD OF THE INVENTION

The present invention relates to apparatus and system for converting motion between relatively movable elements of a mechanism.

BACKGROUND OF THE INVENTION

The apparatus and system of the present invention have particular application in vehicle brake systems to convert the pivoting motion of a lever into an axial displacement of a brake piston and thereby produces a large force to actuate the brake shoes or brake jaws.

West German Offenlegungsschrift No. 3,103,398 shows a device comprising two opposing thrust washers having slanted confronting planar ramps. The thrust washers can turn with respect to one another and are maintained a predetermined distance apart by a plurality of balls. The angular rotation of one thrust washer relative to the other causes the balls to roll along the ramps which in turn produces a spreading movement of the washers which is a function of the angle of the ramps. This motion can then be transmitted to a brake piston for example.

In accordance with another prior known device relating generally to this field, European Patent Disclosure No. 190,453, cylindrical rollers are mounted between the confronting surfaces of two flat thrust washers having biased or slanted ramps. Relative rotation of the thrust washers causes the rollers to roll along the ramps and thus change the distance between the washers. One of the washers is supported in an axial direction so that it rotates inside a housing and the thrust washer is fixed against turning but is guided in such a way that it can move axially in the housing. A lever can be manipulated to turn the rotatable washer. Displacement of the second thrust washer is transmitted by a brake piston to the brake shoe of a disc brake. A relatively large axial force can be stored or built up in this way.

These prior systems have certain disadvantages and drawbacks. For example, it has been found that in these prior devices and systems, there is non-uniform loading of the rolling elements and this produces excessive local loading which ultimately can lead to premature failure of the system. This non-uniform loading is occasioned by production related differences in the height of the ramps, tolerance variables in the diameter of the rolling elements and the unavoidable eccentric introduction of the opposing force to the axially movable thrust washer. Furthermore, in systems utilizing cylindrical rollers, it has been observed that there is a considerable slip component in the region of the ends of the rollers. This produces high bearing friction and considerable wear in the components.

SUMMARY OF THE INVENTION

With the foregoing in mind, it is an object of the present invention to provide novel improvements in devices of this type wherein the rolling elements are subjected to uniform load and undergo less wear than those of the prior systems and apparatus described above. To this end, in accordance with the present invention, the apparatus incorporates conical rollers and at least one of the thrust washers has a conical face. The conical rollers are surrounded by a loose peripheral flange designed as a closed flexible ring which functions to absorb the radial forces from loaded conical rollers and exerts a binding effect on the conical rollers. By utilizing conical rollers and complementary designed thrust washers, there is little or no significant sliding friction during the rolling and a high load bearing capacity is ensured. Moreover, the loose outside flange designed as a flexible ring has the effect of producing an essentially uniform load on the conical rollers regardless of the production tolerances and/or eccentric introduction of opposing forces.

The theory of operation of the apparatus and system of the present invention is as follows. When a force transmitted via the ramps acts on one of the conical rollers, the roller can escape in accordance with the outward directed force component. When this happens, the axial end surface of the roller exerts a radially directed force on the flexible ring which serves as a tensile force in the direction of the circumference of the ring. A binding effect (braking) occurs whereby the other less heavily loaded conical rollers are pulled radially inwardly until the outwardly directed force components of all the conical rollers are in equilibrium. Thus, the apparatus and system of the present invention can be subjected to high loads and yet sustain very little wear.

Other more specific features of the present invention are set forth herein which pertain to specific arrangements to further improve the binding effect of the flexible ring on the conical rollers and which prevent the conical rollers from being displaced so far out of position under excessive load that the ring undergoes permanent elongation or breakage.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
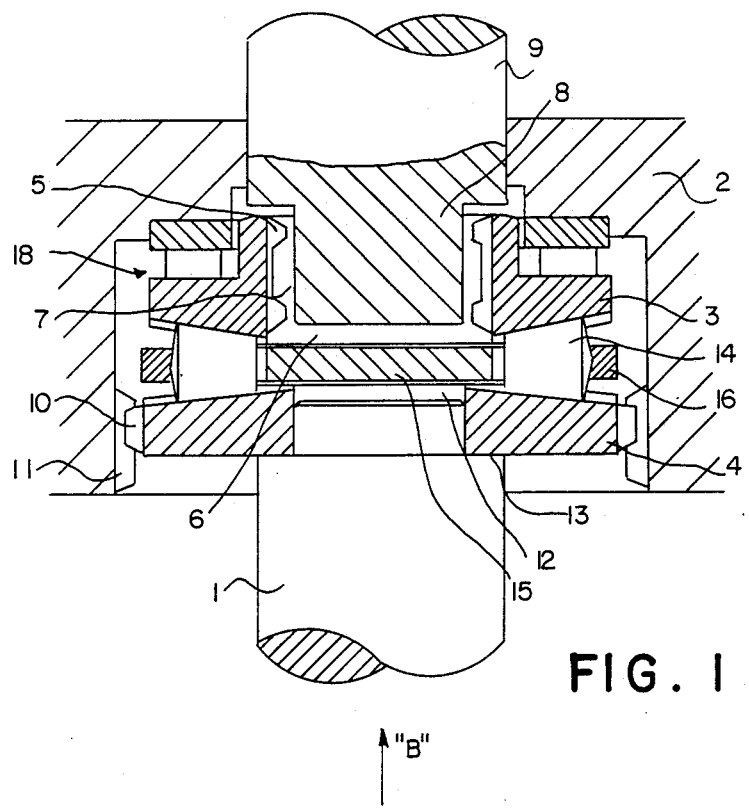
FIG. 1 is a transverse sectional view of a motion transmitting apparatus and system for actuating a brake piston in accordance with the present invention.
Figure 2:
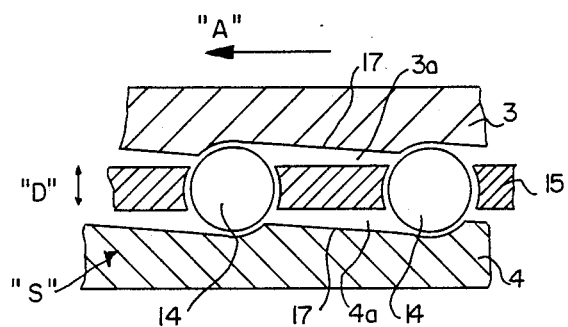
FIG. 2 is an enlarged fragmentary sectional view showing several of the conical rollers for the apparatus illustrated in FIG. 1.
Figure 3:
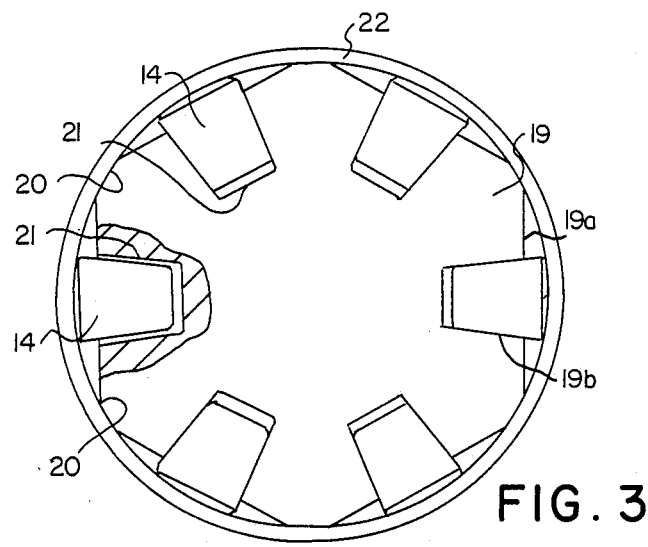
FIG. 3 is a plan view partially in section showing another embodiment of roller configuration in accordance with the present invention for a motion transmitting device of the type illustrated in FIG. 1.

Referring now to the drawings and particularly to FIG. 1 thereof, there is illustrated a motion transfer device and system utilized to actuate a brake piston 1. The apparatus comprises a first thrust washer 3 rotatably supported in a housing 2 and a second thrust washer 4 supported in the housing 2 in a manner to provide freedom of axial movement therein. Rotatable thrust washer 3 has a bore 6 having a plurality of circumferentially spaced radially directed teeth 5 to receive a stepped-down terminal end 8 of a pin 9 which has a plurality of circumferentially spaced radially outwardly directed complementary teeth 7. The opposing thrust washer 4 has teeth on its outer lateral surface which mesh with corresponding teeth 11 of housing 2 and in this manner, the thrust washer 4 is locked against turning. Brake piston 1 is mounted in a central bore 12 of the thrust washer 4 and has a ring-shaped shoulder 13 which bears against the face of the washer so that an axial displacement of the thrust washer 4 is transmitted directly to ring shaped shoulder 13 of brake piston 1.

In accordance with the present invention, a complement of conical rollers 14 is mounted between the thrust washers 3,4 which are guided by an annular member circumscribing the conical rollers and confronting the large outer axial end faces. The rollers are circumferentially spaced by a disk-like cage (15) which as illustrated in the drawings has a series of circumferentially spaced pockets for the rollers. This annular ring 16 is made of a flexible but essentially in extensible material and serves as a loose outer flange surrounding the rollers. The raceways 3a and 4a for the conical rollers 14 on the side facing the conical end surfaces of the thrust washers 3 and 4 have slanted ramps 17. Accordingly, movement of the thrust washer 3 in the direction of the arrow "A" produces rolling movement of the roller 14 along the ramp 17 and this increases the distance "D" between the thrust washers in accordance with the slope S of the ramps. Since the thrust washer 3 is supported by thrust bearing 18 in the axial direction, a rotation brought about by means of pin 9 produces an axial displacement of opposing thrust washer 4. This, in turn, produces an axial force which is transmitted to brake piston 1. This force corresponds to the opposing force indicated by the arrows "B".

There is illustrated in FIGS. 3-8 inclusive 8 other modified roller arrangements for a motion transmitting mechanism of the type described above. For example, in accordance with the modified version of FIG. 3, a cage 19 of disk like form having a polygonal outer periphery as at 19a is provided. The conical rollers 14 are supported in a series of circumferentially spaced generally rectangular pockets 21 extending inwardly from each of the sides 19b of the polygonal peripheral edge of the cage which is illustrated are outwardly open pockets. A flexible ring 22 which bears against the corners 20 of cage 19 surrounds the conical rollers 14. Accordingly, under increased load on the system, a conical roller produces an outwardly directly force component which in turn exerts an increased pressure by the end surface of the roller on the ring 22. Then as the ring 22 tightens arounds the corners 20 of the cage 19, the less heavily loaded conical rollers are displaced radially inwardly until all the conical rollers are under the same load. It is noted that the corners 20 of the polygonally shaped cage act as support points to produce the flexing action illustrated in FIG. 4.

Figure 4:
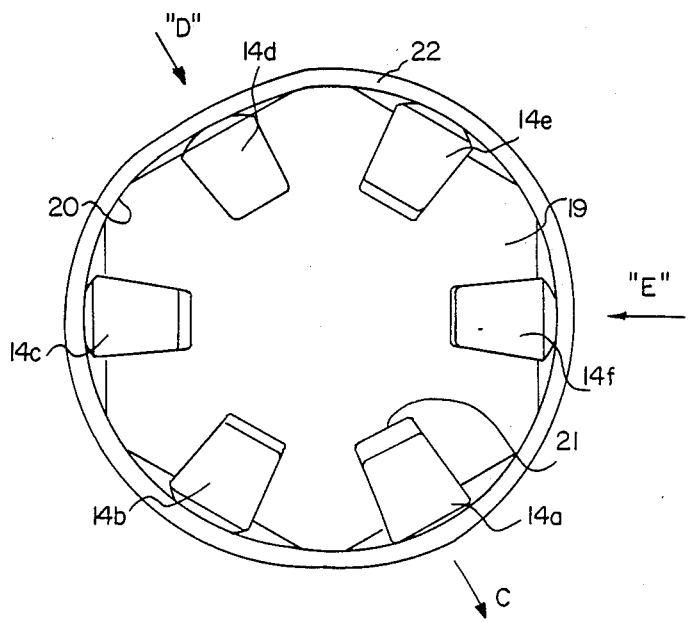
FIG. 4 is a view similar to FIG. 3 showing the rollers under load.

Considering a specific instance and with reference to FIG. 4, when thrust washers 3,4 initially begin to rotate with respect to one another, conical roller 14a is under greater load than conical rollers 14b, 14c and 14e, whereas conical roller 14f is under an even lighter load and conical roller 14d is under the lightest load of all. The conical roller 14a under the greatest load as illustrated is displaced radially outwardly as a result of the outwardly directed force component in the direction of the arrow C and this produces a radial displacement of the ring 22 to tighten it at the corners 20 of the cage 19 and causes a pressing action on the end surfaces of the other conical rollers 14b-14f inclusive. Thus, as illustrated conical rollers 14d and 14f which had been under lighter load are displaced radially inwardly in the pockets as illustrated by the arrows D and E by reason of the differences in the loads, whereas, conical rollers 14b, 14c, and 14e have essentially retained their original radial position. The outwardly directed force components of the conical rollers 14a-14f are now in equilibrium and all carry the same load. It is noted that for sake of illustration and clarity, the radial displacement of the conical rollers is exaggerated in FIG. 4 and in practice the amounts are relatively small.

Figure 5:
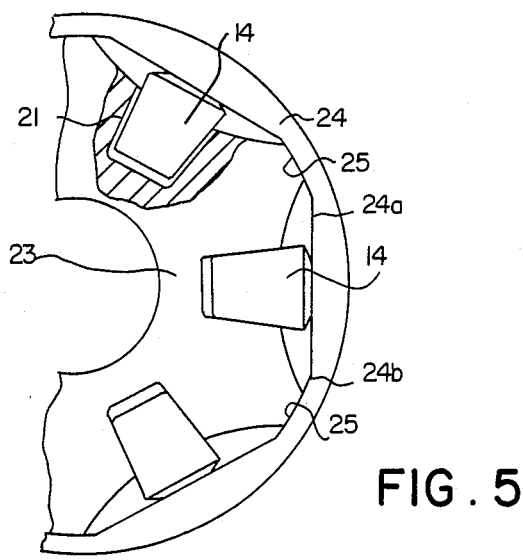
FIGS. 5 and 6 are further modifications of the roller configuration.

FIG. 5 shows another modification of cage for the rolling elements in accordance with the present invention. The cage designated by the numeral 23 is again disk like and in the present instance is in the form of a star having flat support corners at the point locations. The flexible ring 24 in the present instance has an internal peripheral surface that is of polygonal cross section wherein the sides 24a confront the open ends of the pockets for the conical rollers and the fin regions of the ring 24b between adjacent sides of the polygon confront and engage the corner supports of the star shaped cage. By this configuration increased force exerted in the manner described above in connection with the FIG. 4 embodiment created by the end surface of more heavily loaded conical rollers on the ring 24, the thickness of the ring in the present instance means that the ring 24 will not be bent around the convex end surface of the conical rollers. Thus, the contact surfaces remain relatively small and the friction between the rollers and the confronting sides of the cage is relatively slight.

Figure 6:
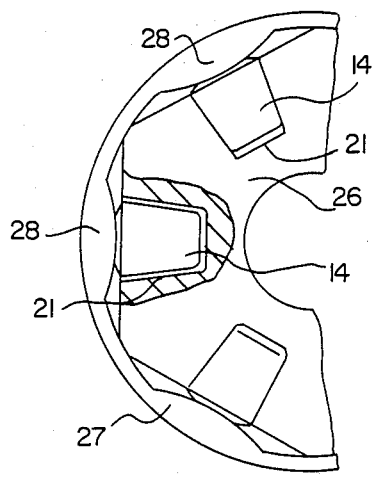

There is illustrated in FIGS. 6 a further modification of the disk like cage and flexible ring which produces effect similar to those described in connection with FIG. 5. As illustrated in FIG. 6, the disk like cage 26 is in the shape of a polygon and the flexible ring is of non-uniform cross section around its circumference and has a plurality of circumferentially spaced radially inwardly directed arcuate projections 28 confronting the spherical axial end faces of the conical rollers 14. As a result of this arrangement, the friction between the ring 27 and the convex end surfaces of the conical rollers is further reduced.

Figure 7:
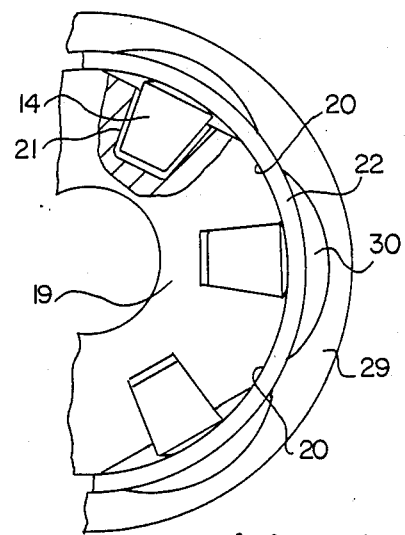
FIG. 7 is a modified form of the embodiment of the invention illustrated in FIG. 3.

There is illustrated in FIG. 7 an arrangement for preventing elongation or even breakage of the flexible ring which may occur by reason of excessive forces acting radially on the flexible ring which can occur when the conical rollers are subjected to excessive loads. To this end, there is provided a stop ring 29 surrounding flexible ring 22. Stop ring 29 rests on flexible ring 22 in the area of cage corners 20 but has recesses 30 in between so that ring 22 is free to deflect radially so far as its contact with stop ring 29.

Figure 8:
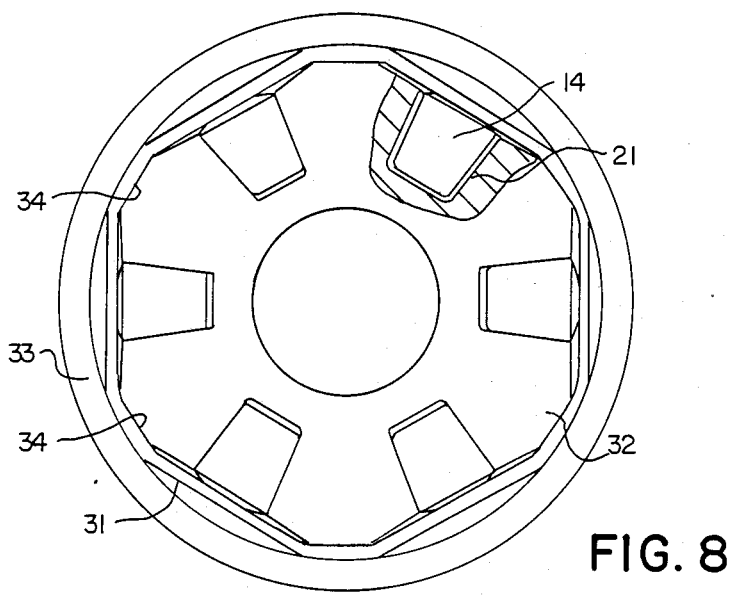
FIG. 8 shows still another roller arrangement for apparatus and system in accordance with the present invention.

FIG. 8, shows another embodiment wherein flexible ring 31 is made especially thin and is dimensioned so that it sits with pretension on corners 34 of polygonal cage 32, which carries conical rollers 14. Ring 31 thus forms, in the assembled state, a polygonal course. This design offers an especially good feedback effect between the conical rollers under the initial load and the less heavily loaded rollers, because the positioning of the conical rollers brought about by pretensioned ring 31 has already eliminated any play. A circular stop ring 33, which is supported in turn on flexible ring 31 in the area of cage corners 34, ensures here that excessive load conditions will not lead to the stretching or breakage of ring 31.

Even though particular embodiments of the present invention have been illustrated and described herein, it is not intended to limit the invention and changes and modifications may be made therein within the scope of the following claims. For example, for the loose external flanges referred to herein general as "flexible rings", rings of an elastic plastic are especially suitable, but rings of spring steel can also be used. In addition, the binding effect described can also be achieved with rings which are produced in the manner of a cable or band. Important criteria for the design of the rings and for the selection of the materials are sufficient flexibility and the capability of absorbing the tensile forces which occur without significant elongation. Alternative solutions are also possible for the stop ring, which, in the exemplary embodiments described, is supported on the cage by way of the flexible ring. For example, it can be attached to the thrust washers.

What is claimed is:

1. Device for producing an axial displacement of two opposing relatively rotatable thrust members, comprising a plurality of conical rolling elements installed between the thrust members which roll on angled ramps and thus change the distance between the thrust members, at least one of the thrust members (3, 4) having a conical race; and a loose outside flange designed as a closed, flexible ring (16, 22, 24, 27, 31) having a continuous uninterrupted inner face confronting the outer axial end faces of the rollers, circumscribing the rollers which absorbs the radial forces proceeding from the loaded conical rollers (14) and exerts a binding effect on the conical rollers (14).

2. Device for producing an axial displacement of two opposing relatively rotatable thrust members, comprising a plurality of conical rolling elements installed between the thrust members which roll on angled ramps and thus change the distance between the thrust members, at least one of the thrust members (3, 4) having a conical face; and a loose outside flange designed as a closed, flexible ring (16, 22, 24, 27, 31) having a continuous uninterrupted inner face confronting the outer axial end faces of the rollers, circumscribing the rollers which absorbs the radial forces proceeding from the loaded conical rollers (14) and exerts a binding effect on the conical roller (14) and a cage (15, 19, 23, 26, 32) having pockets (21) for the rollers (14), said pockets being open toward the outside, the outer contour of the cage having a predetermined profile including corners and wherein the pockets (21) are located in each case between the corners (20, 25, 34) of the cage (15, 19, 23, 26, 32), and in that the flexible ring (16, 22, 24, 27, 31) surrounds the corners (20, 25, 34).

3. Device according to claim 1, wherein flexible ring (24,27) is of greater cross section radially in the contact area with the ends of the conical rollers (14) and of thinner cross section between the conical rollers (14).

4. Device according to claim1, wherein the flexible ring (24) has a circular outer contour and an approximately polygonal inner contour and in that the end surfaces of the conical rollers (14) with the larger diameter rest against one of the polygonal surfaces in the area of maximum radial thickness of the ring (24).

5. Device according to claim 1, wherein the flexible ring (15,22,24,27,31) is made of an elastic, essentially inextensible material.

6. Device according to claim 1, wherein the large ends of the conical rollers (14) are convex.

7. Device for producing an axial displacement of two opposing relatively rotatable thrust members, comprising a plurality of conical rolling elements installed between the thrust members which roll on angled ramps and thus change the distance between the thrust members, at least one of the thrust members (3, 4) having a conical face; and a loose outside flange designed as a closed, flexible ring (16, 22, 24, 27, 31) circumscribing the rollers which absorbs the radial forces proceeding from the loaded conical rollers (14) and exerts a binding effect on the conical rollers (14) and a cage (15, 19, 23, 26, 32) having pockets (21) for the rollers (14), said pockets being open toward the outside, the outer contour of the cage having a predetermined profile including corners and wherein the pockets (21) are located in each case between the corners (20, 25, 34) of the cage (15, 19, 23, 26, 32), and in that the flexible ring (16, 22, 24, 27, 31) surrounds the corners (20, 25, 34), said flexible rings (31) resting with pretension against the corners (34) of the cage (32) and against the end surfaces of the conical rollers (14) whereby in the area of the conical rollers, the ring has a smaller radius than in the area of the corners (34) of the cage.

8. Device for producing an axial displacement of two opposing relatively rotatable thrust members, comprising a plurality of conical rolling elements installed between the thrust members which roll on angled ramps and thus change the distance between the thrust members, at least one of the thrust members (3, 4) having a conical face; and a loose outside flange designed as a closed, flexible ring (16, 22, 24, 27, 31) circumscribing the rollers which absorbs the radial forces proceeding from the loaded conical rollers (14) and exerts a binding effect on the conical rollers (14) and a stop ring (29, 33) surrounding said flexible ring (22, 31) to limit radial deflection.

9. Device according to claim 8, wherein said stop ring (29, 33) is designed so that it rests on the flexible ring (22, 31) essentially only in the area of the corners (20, 34) of the cage.

* * * * *